Patented July 17, 1951

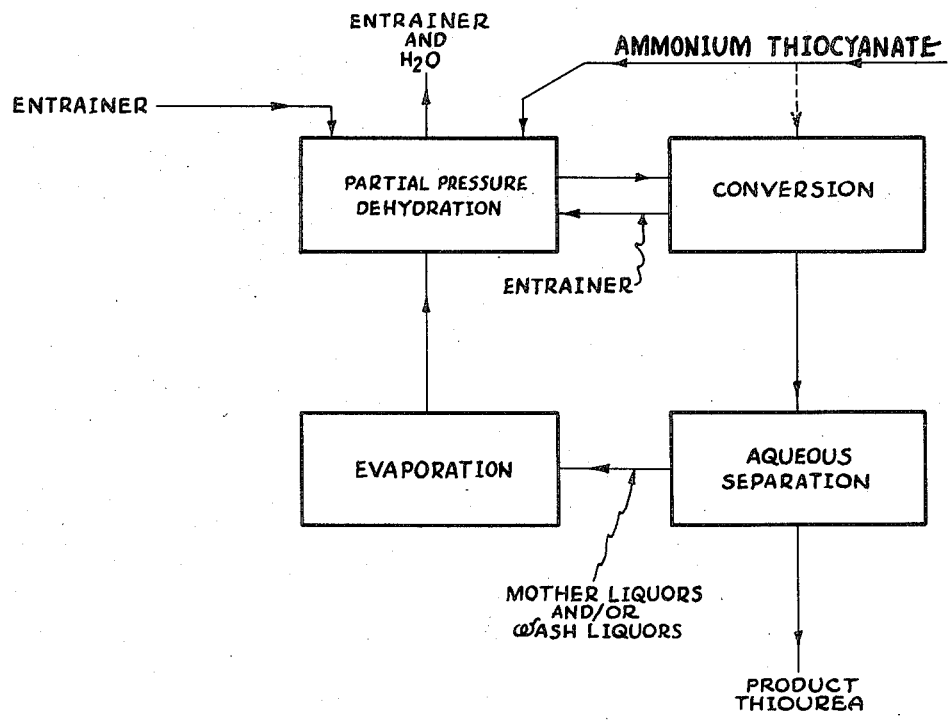

2,560,596

UNITED STATES PATENT OFFICE 2,560,596

PREPARATION OF THIOUREA

Robert E. Powers, Pittsburgh, Pa., and John Mitchell, Boston, Mass., assignors to Koppers Company, Inc., Pittsburgh, Pa., a corporation of Delaware Application October 2, 1947, Serial No. 777,478

23 Claims. (Cl. 260—552)

This invention relates to preparation of thiourea and is particularly directed to the manufacture of thiourea by the thermal conversion of ammonium thiocyanate.

Various methods have been proposed heretofore for the manufacture of thiourea by the thermal conversion of ammonium thiocyanate. In such processes the ammonium thiocyanate is heated under suitable conditions to give a conversion mixture containing 25% to 30% thiourea, followed by treatment of the conversion mix for the recovery of the unconverted ammonium thiocyanate and the thiourea. In the practical application of these processes, however, difficulties have been encountered in obtaining satisfactorily high conversion of ammonium thiocyanate to thiourea without excessively high decomposition or side reactions and furthermore, in obtaining or isolating the thiourea from the conversion mixture and recovering the unconverted ammonium thiocyanate for recycling in the process.

It has been extremely difficult heretofore to effect isolation of thiourea and recovery of unconverted ammonium thiocyanate by any aqueous separation process. These difficulties are well exemplified in the work of Nosalevich et al., Coke & Chemistry [(USRR) 10, 8, pp. 31–34 (1940)] in which the yields were extremely low and the purity of the product even after two crystallizations under conditions which the investigators had determined to be optimum was not more than 85% thiourea. Alternative methods such as the Klempt liquid sulfur dioxide separation process (Die Chemische Technik 15, 1–4 (1942)) were therefore proposed, but such processes were expensive to operate and, moreover, required special equipment and special operating technique not generally available in this art. Moreover, satisfactory separation of gaseous decomposition products from the solvent remains problematical.

A more satisfactory process for making thiourea by the thermal conversion of ammonium thiocyanate and extracting the conversion mixture with water is set forth in Donauer, 1,949,738. Donauer extracts a flaked or granulated conversion mixture with a suitable proportion of cold water to dissolve out ammonium thiocyanate and leave the double salt as a fine white powdery precipitate from which he recovers thiourea by recrystallization. The ammonium thiocyanate is recovered by evaporating the mother liquor to remove most of the water and completing the dehydration during the melting step by carrying out the melting in vacuo. Dehydration in this manner results in a direct loss in yield due to decomposition as evidenced by evolution of gas during the dehydration. Moreover, such a process works satisfactorily only for a short time due to the cyclic build-up of impurities which interferes with and complicates crystallization in the aqueous extraction and dehydration of the mother liquor and results in low total yields of thiourea.

The present invention has for its objects to provide improved processes for manufacturing thiourea by the thermal conversion of ammonium thiocyanate; to minimize conversion losses; to provide improved methods of dehydrating ammonium thiocyanate solutions, to provide improved methods of converting such dehydrated ammonium thiocyanate to thiourea, to provide improved methods of recovering ammonium thiocyanate and/or thiourea from the conversion mixtures, to avoid the disadvantages of the prior art and to obtain advantages as will be pointed out or as will become apparent, and in general to obtain higher yields of thiourea and/or greater economy per unit of thiourea produced. Further objects will appear as the description proceeds.

These objects are accomplished in the present invention, of which the following is a detailed description made with reference to the accompanying flow sheet illustrating a typical embodiment of the invention.

When ammonium thiocyanate is heated to a proper temperature for a sufficient time, it converts to thiourea. The extent to which the conversion takes place depends upon the relative rates of the ammonium thiocyanate conversion and the thiourea conversion. Equilibrium is established somewhere in the vicinity of 25% thiourea, although this may be less and sometimes more, according to the conditions under which the conversion is effected.

In carrying out the conversion, two things are of prime importance. The first of these is that the ammonium thiocyanate must be thoroughly dry; and the second is that the temperature should be kept as low as practical during the conversion. The reasons these two things are of prime importance are that the presence of water during the conversion has been shown to accelerate decomposition and the formation of undesirable by-products and that excessively high temperatures similarly accelerate decomposition and formation of undesirable by-products.

The formation of these undesirable by-products and decomposition in the conversion are objectionable in several respects. In the first place, the equilibrium between ammonium thiocyanate and thiourea is such that only a minor proportion of the thiourea theoretically equivalent to the ammonium thiocyanate processed could be recovered in any single pass. It is necessary, therefore, to recycle much ammonium thiocyanate and some thiourea. Any decomposition in the conversion and any by-products formed consequently accumulate entirely out of proportion to the production of thiourea. In the second place, accumulation of undesirable by-products as a result of recycling of ammonium thiocyanate and thiourea to the conversion has a deleterious effect, not only upon the conversion efficiency, but also upon the recovery of thiourea and ammonium thiocyanate.

If it be borne in mind that each increment of raw ammonium thiocyanate charged must go through the conversion and subsequent treatments for separating and drying the unconverted thiocyanate on the average of at least four times (the number of times for a 100% efficient process being the reciprocal of the mol fraction of thiourea in the conversion mixture), it is clearly evident that any treatment which results in the decomposition of ammonium thiocyanate and the formation of impurities therefrom, or the presence of any material, such as water, which promotes such decomposition and formation of impurities during the heating and conversion, has an entirely disproportionate effect on the operation of the process as a whole and that conversely any improvement whereby such decomposition and formation of impurities are minimized has an effect upon the entire process entirely out of proportion to its effect in or upon the individual steps per se. Hence, any treatment to which the ammonium thiocyanate is subjected prior to the melting and conversion adversely affects the entire process in direct proportion as impurities and decomposition products are formed from the ammonium thiocyanate in such treatments and in direct proportion as the recycled ammonium thiocyanate is to the raw ammonium thiocyanate charged or in other words in proportion to the number of times that the average increment of raw ammonium thiocyanate charged is subjected to the process through recycling. As the quality of the recycled ammonium thiocyanate subjected to conversion necessarily and disproportionately affects the content of impurities in the conversion mixture, either by simply introducing the impurities into the conversion mixture as such or by stimulating the formation therein as, for example, a consequence of subjecting ammonium thiocyanate containing water to melting and conversion temperatures, it is important to the process as a whole that any treatment of by-product aqueous ammonium thiocyanate solutions for the recovery of ammonium thiocyanate for recycling to the conversion be so conducted as to minimize or avoid the formation in such operations of undesirable by-products can be carried to a stage such that completely dry ammonium thiocyanate is obtained before it is subjected to conversion.

It is the purpose of this invention therefore to provide means for recovering ammonium thiocyanate from the ammonium thiocyanate solutions by-product of the process and to provide improved means cooperative therewith of minimizing by-product formation during the conversion.

Referring now more particularly to the process illustrated in the accompanying flow sheet, there is shown a cyclic process involving conversion of ammonium thiocyanate to thiourea, separation of the thiourea in an aqueous separation and dehydration of the mother liquors and/or wash liquors of the aqueous separation for the recovery of ammonium thiocyanate for recycling to the conversion. The dehydration is shown to involve a step of evaporation followed by partial pressure dehydration in the presence of a suitable entrainer such as benzene, toluene, xylene and like inert liquids capable of reducing the partial pressure of water vapor over the solution. The evaporation step may also be carried out in the presence of an entrainer, but ordinarily this is unnecessary because the bulk of the water may be evaporated, especially if conducted in vacuo without the temperature of the solution becoming high enough to cause formation of undesirable by-product or decomposition of ammonium thiocyanate and thiourea. The essential thing is that the partial pressure dehydration be effected over the latter part of the dehydration, and especially over that part during which crystals of ammonium thiocyanate begin to form in the solution since otherwise the temperature cannot be kept low enough during the dehydration to prevent undesirable decomposition and by-product formation.

In carrying out the dehydration it is desirable to maintain the temperature below 110° C., preferably below about 100° C. Up to about 80% of the water can be evaporated under moderate vacuum without exceeding a temperature of about 100° C. After that, it becomes progressively more difficult to dehydrate the solutions. In this regard, it should be remembered that the solutions which are dehydrated are not simple ammonium thiocyanate solutions but contain substantial quantities of thiourea, and any by-product impurities which have not been carried out of the cycle with the product thiourea. Such solutions become progressively more difficult to dehydrate as the content of by-product impurities increases and in turn the content of by-product impurities tends to increase as the dehydration becomes more difficult so that a vicious circle is established in conducting the process in accordance with the prior art practices such as are outlined in Donauer.

In order to avoid this progressive build up of decomposition products in the cycle we have found it necessary to employ partial pressure dehydration over the latter part of the dehydration; say, over about the last 20% or so of the dehydration. We have found that if suitable precautions are taken essentially over the period in which ammonium thiocyanate crystallizes out in the solution being dehydrated, it is possible to obtain satisfactory dehydration of the ammonium thiocyanate without undesirable decomposition. We prefer to maintain the temperature during the partial pressure dehydration below 110° C. and preferably below 100° C. and to this end conduct the partial pressure dehydration under vacuum as required to maintain the desired temperature and because, at these low temperatures, ammonium thiocyanate crystallizes out during the partial pressure dehydration, we have found it necessary to effect vigorous agitation in order to maintain the crystals dispersed in the dehydrating medium. If this is not done, a crust forms which retards the vaporization of water, and what is more important, the formation of undesirable by-products is promoted not only because of the excessively long time required for the dehydration, but also because of local overheating in the bed or beds of crystals which tend to accumulate in the apparatus. It is an important feature of the invention, therefore, to effect the partial pressure dehydration with the dehydrant, i. e., the material undergoing dehydration dispersed in the entrainer. By so conducting the partial pressure dehydration, the droplets of aqueous liquor and the crystals of ammonium thiocyanate as formed are maintained segregated one from another. Filming over and local overheating due to massing of crystals is therefore substantially avoided.

When the partial pressure dehydration is complete there will be obtained a slurry of anhydrous crystals in the entrainer. If desired, the entrainer may be separated from the crystals before subjecting the anhydrous crystals to the conversion step. We have found, however, that it is neither necessary nor desirable to effect this separation, but that the conversion may be effected in the presence of the entrainer without detriment to the conversion efficiency. The entrainer provides an excellent medium in which to effect melting of the crystals and by maintaining the crystals dispersed in this medium during the melting operation all possibility of local overheating is avoided. Formation of undesirable by-products and decomposition are thus still further minimized.

After the anhydrous crystals are melted the heating is continued, preferably at a lower temperature as will be discussed, until substantial conversion of the ammonium thiocyanate to the thiourea is effected. It is not necessary to agitate the mass during the conversion proper. As a matter of fact, we have found that the decomposition is substantially less when the mass is not agitated. Thus, while it is necessary to agitate the entrainer during the partial pressure dehydration sufficiently to maintain the dehydrant dispersed therein, and while it is desirable to agitate the entrainer during the melting in order to keep the anhydrous crystals dispersed therein, it is not necessary to do this during the conversion and it is, in fact, undesirable to do so. It is in accordance with the invention, therefore, to effect partial pressure dehydration with the dehydrant dispersed in suitable liquid entrainer, and to carry out the melting and conversion without separation of the liquid entrainer. After the conversion is complete the entrainer may be separated by decantation, evaporating, centrifuging or otherwise, and returned to the partial pressure dehydration. The conversion mix is then subjected to any suitable form of aqueous separation to separate product thiourea and the mother liquors and/or wash liquors are processed as described for the recovery of ammonium thiocyanate.

In carrying out the processes of the invention we prefer to use xylene as the entrainer, because the physical constants of xylene are such that the desired temperatures in the partial pressure dehydration and in the conversion may be easily obtained by regulating the pressure on the system. Thus, during the partial pressure dehydration a vacuum may be drawn as required to maintain the desired temperature, and during the conversion slight elevation of pressure above atmospheric is all that is necessary to obtain the temperature necessary to effect melting of the anhydrous crystals and its conversion to thiourea.

The raw ammonium thiocyanate, i. e., ammonium thiocyanate which is not recycled, but which is obtained from a source exterior of the process may be added directly to the conversion, but this is undesirable because such ammonium thiocyanate may contain water. Ammonium thiocyanate is highly hygroscopic and in the forms commercially available it usually contains appreciable amounts of water. It is desirable therefore to introduce the raw ammonium thiocyanate either in or in advance of the partial pressure dehydration. Any water which the raw ammonium thiocyanate may have contained will thus be removed prior to its being subjected to conversion.

While in its broader aspects the invention is applicable independently of any particular temperature or time utilized in the melting or the conversion, it is none-the-less complementary to dehydration as described so to regulate the temperature in the melting and conversion steps as to minimize or to avoid the formation of by-product impurities. It is desirable, therefore, to raise the temperature above 145° C. only during the melting period. Ordinarily it will be sufficient to heat the slurry of crystals in the entrainer to a temperature of about 150–152° C. in order completely to fuse the crystals. Preferably, the temperature should be kept below 155° C. Thus the temperature should be high enough to effect fusion but below 155° C. As soon as complete liquefication of the ammonium thiocyanate is effected, the temperature is reduced to below 145° C. The temperature may safely be lowered to below 145° C., because during the melting period sufficient thiourea will be formed to lower the fusion temperature of the conversion mixture. The temperature in the order of 140–142° C. has been found suitable. A lower temperature may be used providing excessive crystallization of ammonium thiocyanate does not result. Thus, the temperature during the melting step should be high enough to effect fusion, but below 155° C. and the temperature during the conversion should be high enough to keep the product fused, but below about 145° C. Under these conditions, especially when the mass is agitated during the melting and not agitated during the conversion, we obtain an overall process in which decomposition is held to a minimum and formation of undesirable by-product impurities, such as, guanidine thiocyanate, is substantially avoided.

The conversion should be stopped before the rate of formation of impurities becomes excessive. Suitably, it may be stopped when the rate of formation of impurities closely approaches or is equal to the rate of formation of thiourea. When the initial heating is carried out at a temperature of 150–152° C. for a period of 1 to 2 hours it will be sufficient to continue heating at 140–143° C. up to about 8 or 10 hours. Further heating is likely to cause formation of excessive impurities and after about 8 hours or so the rate of conversion to thiourea will have dropped off markedly and will then approximate the rate of formation of impurities.

While xylene is particularly advantageous in this process because the desired temperatures may be maintained with little variations from atmospheric pressure, other entrainers may be used. Preferably, the entrainer should be one which is non-solvent for water, ammonium thiocyanate and thiourea and, of course, one which is inert to these materials. It also should be capable of reducing the partial pressure of water over the ammonium thiocyanate solution. Generally speaking, any inert non-polar solvent may be used. Thus, aliphatic and aromatic hydrocarbons and their indifferent substitution products as, for example, benzene, monochlorobenzene, toluene, cumene and like aromatics, petroleum fractions of like boiling ranges, and like products may be used effectively.

In a typical embodiment of the invention 230 parts (parts are by weight unless otherwise specified) of ammonium thiocyanate are dissolved in 1800 parts of ammonium thiocyanate liquors, by product of the process, containing 790 parts of ammonium thiocyanate, 64 parts thiourea and balance, water. This solution is evaporated under vacuum at 19-24 inches mercury until crystals begin to appear in the solution. In this way, about 80% of the water in the solution is removed and the temperature does not rise above 101° C. To complete the dehydration 1400 parts of xylene is added and while the whole charge is being violently agitated so as to maintain the aqueous phase and any crystals formed completely dispersed in the xylene, water and xylene are distilled at a vacuum of about 13 inches mercury. Xylene is continuously separated from the condensed distillate and returned to the dehydration. By this means all the remaining water is evaporated without the temperature rising above 100° C. The final product is a slurry of dry crystals in xylene.

The slurry is now heated with agitation to about 150° C. in order to melt the crystals and as soon as complete melting is obtained, agitation is stopped and the temperature is dropped to between 140° C. and 142° C. where it is held for about 7 hours or as required to produce a melt containing about 25% thiourea. The upper xylene layer is then decanted and evaporated from the melt and returned to the dehydration.

The conversion melt is now poured into 818 parts of crushed ice and the whole is stirred until the temperature reaches about —10° C. The slurry is then centrifuged resulting in a cake containing about 70% thiourea on a dry basis. The wet cake (about 400 parts) is suspended in 130 parts of water and recentrifuged to give about 200 parts of crude thiourea. The filtrate of the two centrifugings is combined to form the ammonium thiocyanate solution recycled to the dehydration and conversion steps.

While we have described our invention with reference to particular embodiment thereof, it will be understood that variation may be made without departing from the spirit and scope of the invention as described above and as set forth in the appended claims.

We claim:

1. In a cyclic process for the manufacture of thiourea by the thermal isomerization conversion of ammonium thiocyanate to thiourea wherein because of the low conversion of ammonium thiocyanate to thiourea inherent in said isomerization the ammonium thiocyanate must be separated from the conversion mixture and recycled to the conversion and wherein the conversion mixture is subjected to an aqueous treatment for effecting said separation in which the ammonium thiocyanate is obtained in the form of an aqueous solution and wherein because of said low conversion and said recycling of ammonium thiocyanate the average increment of ammonium thiocyanate introduced into said process passes through said conversion and said aqueous treatment at least about four times and consequently must be recovered from said aqueous solution an equal number of times, the method whereby the process may be carried out over a long period involving repeated recycling of ammonium thiocyanate and whereby cyclic buildup of impurities and decomposition products is minimized which comprises the steps of: dehydrating said ammonium thiocyanate solution under the partial pressure of an entrainer while maintaining said solution dispersed in a dispersion medium consisting essentially of the liquid of said entrainer until a completely dry ammonium thiocyanate is obtained, melting the dried ammonium thiocyanate, incorporating raw ammonium thiocyanate into said melt, heating said melt containing said raw ammonium thiocyanate to convert a portion to thiourea, recovering said entrainer and recycling it to said dehydration, then recovering thiourea from the conversion mixture by said aqueous treatment whereby the bulk of the unconverted ammonium thiocyanate is recovered as said aqueous solution and returning the thus recovered aqueous solution to the dehydration step to complete the cycle and repeating the cycle a plurality of times sufficient to cause each average increment of raw ammonium thiocyanate charged to pass through said melting, said conversion, said aqueous treatment, and said dehydration at least four times.

2. The process of claim 1 in which the entrainer is the vapor of an inert organic liquid non-solvent for water, ammonium thiocyanate, and thiourea.

3. The process of claim 2 in which the melting is effected without removing said entrainer liquid and with sufficient agitation to keep the ammonium thiocyanate suspended in said entrainer liquid.

4. The process of claim 3 in which the agitation is stopped after the melting is completed and the conversion is effected under cover of said entrainer liquid.

5. The process of claim 4 in which the entrainer is xylene.

6. The process of claim 5 in which the temperature during the dehydration of ammonium thiocyanate is kept below 100° C.

7. The process of claim 6 in which the temperature during the melting and heating steps is kept below about 155° C. until the ammonium thiocyanate is completely melted and sufficient thiourea is formed to lower the melting point to below 145° C. and then lowered and the heating continued at a temperature above the melting point but below 145° C.

8. The method of claim 7 in which the bulk of the water up to 80% contained in said recovered aqueous thiocyanate solution is evaporated prior to said dehydration.

9. The method of claim 8 in which undry raw ammonium thiocyanate is incorporated in the ammonium thiocyanate solution subjected to said dehydration whereby it is also completely dried.

10. The process of claim 1 in which undry raw ammonium thiocyanate is incorporated in the ammonium thiocyanate solution subjected to said dehydration whereby it is also completely dried.

11. The process of claim 1 in which the bulk of the water up to 80% contained in said recovered aqueous thiocyanate solution is evaporated prior to said dehydration.

12. In a process for the manufacture of thiourea from aqueous solution containing predominantly ammonium thiocyanate and containing also thiourea, the steps of: evaporating water from said solution under the partial pressure of an entrainer consisting of the vapor of an inert liquid which is non-solvent to water, ammonium thiocyanate, and thiourea while maintaining said solution dispersed in said liquid, continuing the evaporation of water until a suspension of dry ammonium thiocyanate in said liquid is obtained, heating said suspension with sufficient agitation to maintain said suspension as required to melt the suspended solids, allowing the dispersed liquid globules thus formed to coalesce and heating the coalesced liquid under cover of said inert liquid as required to convert a substantial portion of it to thiourea.

13. The method of claim 12 in which the temperature is kept below 155° C. during the melting and thereafter lowered to a temperature below 145° C. and kept between that temperature and the melting point until the desired conversion is obtained.

14. The process of claim 13 in which the entrainer is xylene.

15. The process of claim 14 in which the evaporation is effected at a temperature below about 110° C.

16. The process of claim 13 in which the temperature during the evaporation is kept below about 110° C.

17. The process of claim 12 in which the temperature during the evaporation is kept below a temperature of about 110° C.

18. In a process for the manufacture of thiourea from ammonium thiocyanate, the steps of melting an anhydrous mixture of ammonium thiocyanate containing a small amount of thiourea while dispersed and suspended in an inert non-solvent liquid having a specific gravity less than said liquid anhydrous ammonium thiocyanate, breaking said suspension, heating the melted anhydrous mixture under cover of said inert non-solvent liquid at a temperature and for a time sufficient to convert a substantial proportion of the ammonium thiocyanate to thiourea.

19. The process of claim 18 in which the anhydrous mixture is melted at a temperature below 155° C. and in which the heating is effected at a temperature below 145° C. but above the melting point.

20. The process of claim 19 in which said inert non-solvent liquid is xylene and in which sufficient pressure is maintained on the system to keep the xylene in the liquid state.

21. In a cyclic process for the manufacture of thiourea which comprises dehydrating a recycled aqueous solution of ammonium thiocyanate to dryness, incorporating raw ammonium thiocyanate with the dried ammonium thiocyanate, melting the dried ammonium thiocyanate containing the incorporated raw ammonium thiocyanate, heating the melt to convert a portion of the ammonium thiocyanate to thiourea, treating the conversion mixture to isolate thiourea and to recover ammonium thiocyanate in an aqueous solution and returning the last named aqueous solution to said dehydration, the combination which comprises carrying out the melting and heating and at least the last 20% of the dehydration steps in the presence of liquid xylene and regulating the pressure to maintain a temperature less than 155° C. during the melting, less than 145° C. during the heating, and less than 110° C. during the dehydration.

22. The process of claim 21 in which the dehydration and the melting but not the heating steps are effected with sufficient agitation to maintain the ammonium thiocyanate suspended in said liquid xylene.

23. In a cyclic process for the production of thiourea by the thermal isomerization conversion of ammonium thiocyanate thiourea in which the unconverted ammonium thiocyanate is recovered and recycled in an aqueous solution, the steps of: evaporating water from said recycled solution at a pressure such that the temperature does not exceed 110° C., said evaporation over at least the last 20% thereof being carried out under the partial pressure of the entraining vapor of an inert organic liquid nonsolvent for water, ammonium thiocyanate, and thiourea and with the solution being dehydrated in suspension in the liquid of said entrainer, incorporating undry raw ammonium thiocyanate in said suspension, agitating said liquid to maintain said suspension and continuing the evaporation of water until a slurry containing anhydrous ammonium thiocyanate suspended in said liquid is obtained, agitating said slurry sufficient to maintain the suspension, heating said slurry while continuing said agitation to a temperature sufficient to melt said anhydrous ammonium thiocyanate by below 155° C. for a time sufficient to produce a melt having a melting point below 145° C., stopping the agitation thereby allowing the melt to coalesce under the cover of said inert liquid and then applying heat to said melt to maintain it at a temperature above the melting point but below 145° C. for a time sufficient to convert a substantial portion of the ammonium thiocyanate it contains to thiourea, separating said inert liquid from the conversion mixture, recycling the separated inert liquid to said dehydration and treating said melt to recover thiourea and said aqueous ammonium thiocyanate solution and recycling said recovered aqueous solution to said dehydration.

ROBERT E. POWERS.
JOHN MITCHELL.

REFERENCES CITED

The following references are of record in the file of this patent:

UNITED STATES PATENTS

| Number | Name | Date |
|---|---|---|
| 1,949,738 | Donauer | Mar. 6, 1934 |
| 1,989,541 | Blanchod | Jan. 29, 1935 |
| 2,138,048 | Vesce | Nov. 29, 1938 |
| 2,144,654 | Guthman et al. | Jan. 24, 1939 |
| 2,264,759 | Jones | Dec. 2, 1941 |
| 2,326,099 | Kokatnur | Aug. 3, 1943 |

FOREIGN PATENTS

| Number | Country | Date |
|---|---|---|
| 564,784 | Germany | Sept. 26, 1933 |
| 469,352 | Great Britain | July 23, 1937 |

OTHER REFERENCES

Othmer: "Partial Pressure Processes," Industrial and Engineering Chemistry, vol. 33, pages 1106–1112.

Certificate of Correction

Patent No. 2,560,596                                                July 17, 1951

ROBERT E. POWERS ET AL.

It is hereby certified that error appears in the printed specification of the above numbered patent requiring correction as follows:

Column 10, line 29, for "by below" read *but below*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*